March 17, 1970 C. H. SCHAAR 3,500,831
FILM WALLED RESILIENT NIPPLES AND CONTAINERS AND
LIQUID CONTAINING PACKAGES INTEGRAL THEREWITH
Original Filed May 14, 1964 2 Sheets-Sheet 2
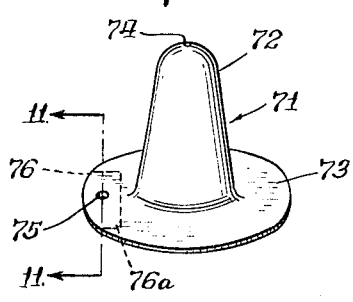
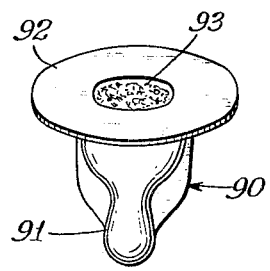
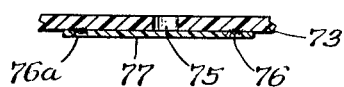
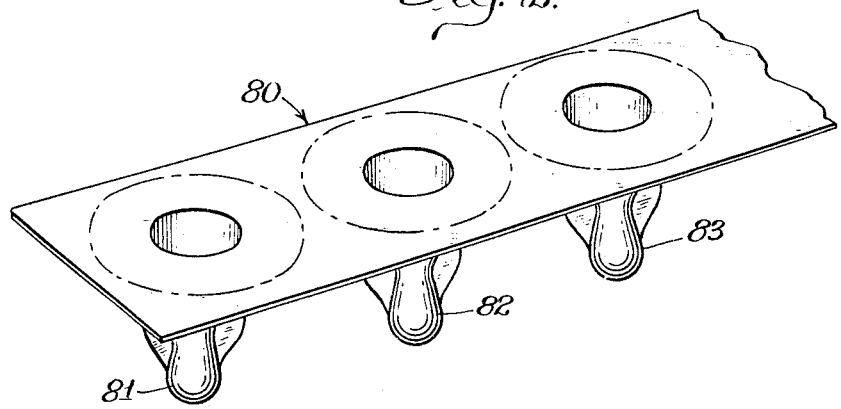
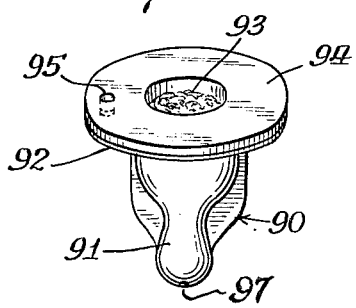
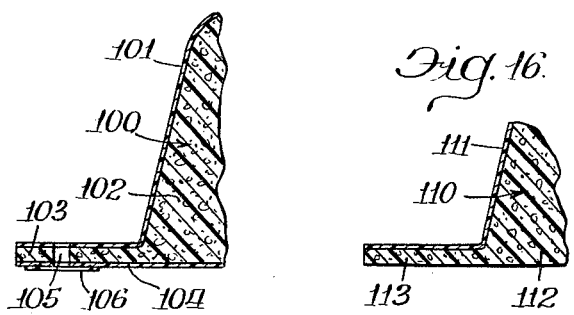
Inventor:
Charles H. Schaar
By James J. Fawcett
Atty.

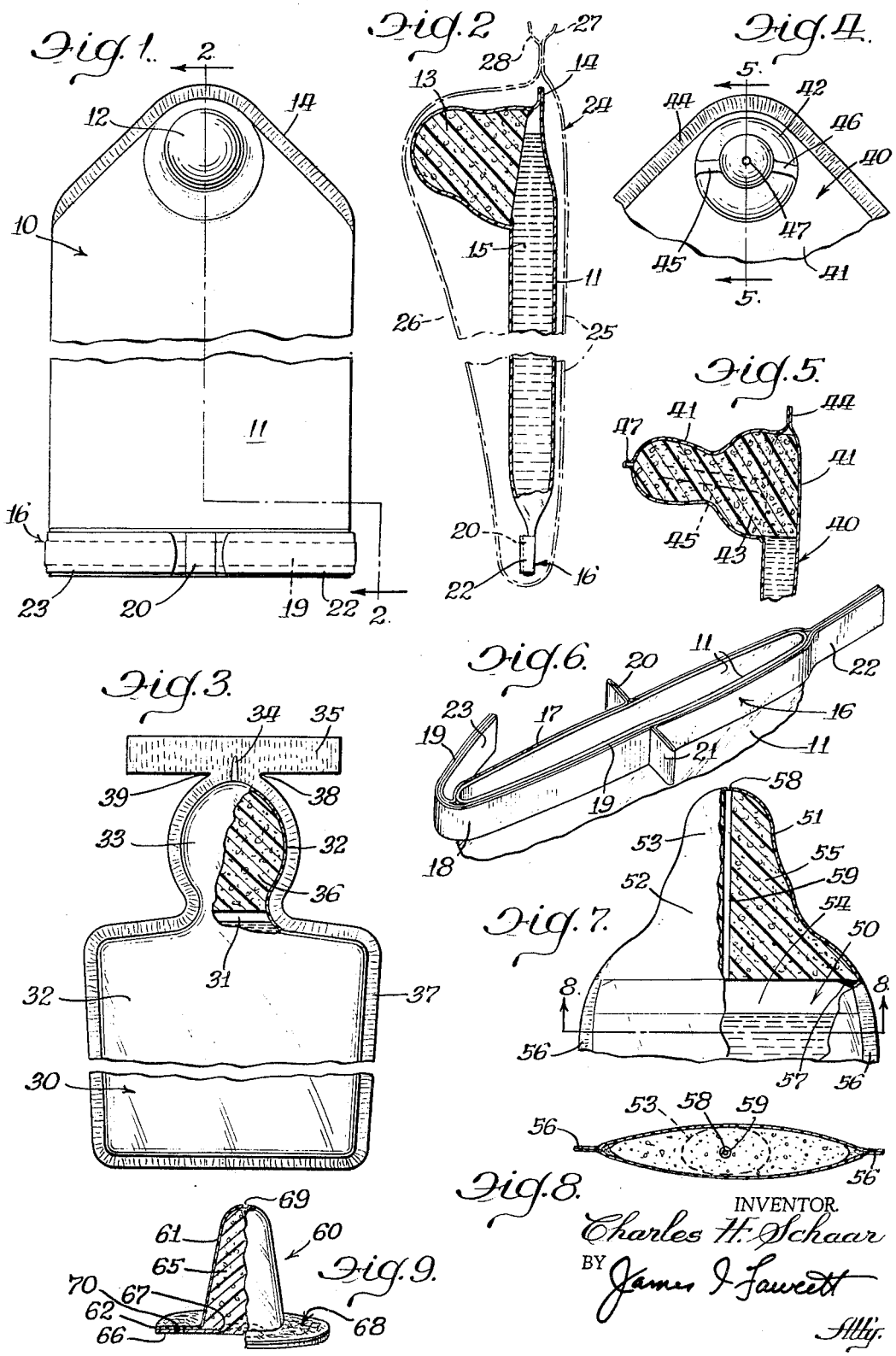

United States Patent Office 3,500,831
Patented Mar. 17, 1970

1

3,500,831
FILM WALLED RESILIENT NIPPLES AND CONTAINERS AND LIQUID CONTAINING PACKAGES INTEGRAL THEREWITH
Charles H. Schaar, Libertyville, Ill., assignor to The Kendall Company, Boston, Mass., a corporation of Massachusetts
Continuation of application Ser. No. 367,353, May 14, 1964. This application Oct. 17, 1968, Ser. No. 781,675
Int. Cl. A61j 11/02
U.S. Cl. 128—252                                6 Claims

ABSTRACT OF THE DISCLOSURE

Infant feeding nipple in which the outer wall of the upstanding teat portion is a thin, limp film which is maintained in teat shape by a filling of resilient material through which liquid may flow, including a nipple with a stiff flange extending radially outwardly from the base of the teat providing a means of attachment to collapsible and non-collapsible containers and venting means in the flange of the nipple.

---

This application is a continuation of application Ser. No. 367,353, filed May 14, 1964, now abandoned.

This invention is concerned with film-walled disposable nursing nipples and with disposable film-walled containers and prefilled packages incorporating film-walled nursing nipples. Particularly, this invention is concerned with such products in which a hollow nipple shell contains a resilient filling through which the liquid baby food flows. The finished nipple is soft, flesh-like, yieldingly resilient and pleasantly acceptable to babies.

Heretofore, nursing nipples for babies have been made in the form of hollow cured rubber moldings whose thickness and structure have provided a relatively soft resilient product which although not perfect has been highly successful. But these cured rubber moldings have been expensive, so that it has been uneconomical to use a nipple once and throw it away. Reuse, of course, even if the nipple were sterile when sold, required sterilization. What a great many mothers have hoped for and never were furnished was a sterile prepackaged infant feeding in a nipple bearing container economical enough that the empty container and nipple could be disposed of, thus ending the monotonous cycle of sterilizing bottles, nipples, retaining caps, overcaps, etc. and the preparation and filling of bottles with infant "formula."

The rubber nipple in addition to being expensive requires the use of attachment means whether the container used be glass, metal or a plastic tube. Cured rubber is not heat-sealable and does not readily lend itself to simple fast manufacturing techniques possible with heat-sealable material.

It is an object of this invention to provide a flesh-like nursing nipple which is so economical to produce as to be truly disposable and which is pleasingly acceptable to a nursing baby.

It is a further object of this invention to provide a fillable and sealable container for baby food liquids incorporating an integral pleasingly acceptable nursing nipple, the container being truly disposable.

2

It is a still further object of this invention to provide a truly disposable package of sterile liquid baby food including an integral sterile nipple which is pleasingly acceptable.

It is another object of this invention to provide a truly disposable package of liquid baby food including an acceptable integral nipple which package may be terminally sterilized as in a hospital autoclave.

Referring to the figures:

FIGURE 1 illustrates a typical fillable and sealable disposable film container for liquid baby foods in accordance with the invention.

FIGURE 2 illustrates a typical sterile filled container of the invention sealed in a peelable outer envelope.

FIGURE 3 illustrates a very simple embodiment of the invention in the form of a filled container.

FIGURE 4 illustrates the nipple portion of a typical filled package of the invention in which the nipple is of the ribbed shape.

FIGURE 5 is a partial cross section of the filled package of FIGURE 4 showing a typical disposition of the nipple filling material and a typical hollow nib which when severed provides a nipple orifice.

FIGURE 6 shows a typical means of closing the end of a fillable container of the invention.

FIGURE 7 illustrates an embodiment of the invention comprising an oval-shaped nipple formed substantially the full width of the package with a pierced resilient filling.

FIGURE 8 is a cross section of the filled package of FIGURE 7.

FIGURE 9 is an illustration partly in section of a typical disposable nipple of the invention which is adapted to be substituted for the usual rubber nipple or sealed to an opening in a liquid-filled package.

FIGURE 10 is an illustration of a nipple very similar to that illustrated in FIGURE 9 but with a film acting as a flap valve.

FIGURE 11 illustrates an enlarged view of the flap valve of FIGURE 10 in cross section.

FIGURE 12 illustrates a series of nipple shells formed from sheet material.

FIGURE 13 illustrates a nipple cut from the series of FIGURE 12 and filled with resilient foam cast in situ.

FIGURE 14 illustrates a finished nipple of the invention including a strengthening base layer and a valve.

FIGURE 15 illustrates a variation in which the foam extends into the base area and the valve has a film flap.

FIGURE 16 illustrates still another variation in which the foam is open-celled and that part extending into the base forms an inherent valve.

The objects of the invention are attained by using thermoplastic films which may be as thin as 1 mil and which may be either individual films or laminates. In some embodiments of the invention such as is illustrated in FIGURE 3, the walls of the container are heat-sealed to form the flat contour of a nipple at one end with an open bottom at the other end. A plug of unified resilient material is then placed in the nipple cavity between the sheets. If this resilient material is open-celled or permeable so that liquids will pass through, it is not necessary to provide one or more passages through it. If, however, the resilient material is closed-celled and substantially impermeable, one or more channels for liquid flow such as that shown in FIGURE 7 should be provided.

While packages similar to that illustrated in FIGURE 3 are perhaps the least expensive and are workable, more elaborate nipples and packages are preferred. One may, of course, provide a less objectionable seal than the fin type illustrated in FIGURE 3 but a preferred embodiment of the invention is one in which the nipple, though still of very thin film, is formed or shaped without seams. This can be accomplished by a number of means. For instance, a flat film may be softened with solvents or by heat (which is preferable) to the point at which it may be shaped. Such shaping is retained after the solvent has gone or the film has cooled. Shaping may be accomplished by the use of a vacuum, by means of which the softened film may be made to conform to the concavities of a female mold. Gas pressure may be used to accomplish the same results or both pressure and vacuum may be used in conjunction. Certain films may also be formed either from the softened or unsoftened state by means of a relatively moving male die with or without a female die and acting on a restricted area of the film. Also in certain instances the shaping may be attained by deposition upon a male or female form from a latex, a solution or a hot melt of the film forming material.

But in any event, the nipple shell as formed is not suitable or pleasingly acceptable per se as a baby nipple because it offers little or no resistance to collapse when even light pressure is exerted tending to flatten it. When the hollow shell is at least partially filled with resilient material, however, the flesh-like softness of the thin film and resilient material composite is an advantage which is not realized with thicker-walled nipples. The preferred nipples of this invention are substantially filled with resilient material in the form of a unitary plug. The preferred material is polyurethane sponge or foam of the open-celled type having a liquid porosity measured by the method explained hereinafter of 30 seconds or less. Other spongy and resilient materials are suitable and may even be preferred by some people. Polyethylene foam sponges may be used as may both natural latex and nitrile rubber foams and fine cellulose sponges. The latter have a tendency to be stiff until wetted with the liquid food but once wetted they perform satisfactorily.

Vinyl foam is not a preferred resilient material because of the possibility of decomposition products which may be toxic. However, when properly free of such toxic materials, vinyl foam is quite satisfactory.

As was indicated above, sponges and other materials which permit the passage of fluids are preferred but the essential feature of the filling material for the nipple is its resiliency and conformability under slight pressure. Materials which have these qualities may be made porous by providing channels through them.

The preferred films for the products of this invention are laminates of nylon and polyethylene. This material may be cold formed using a male die and may be readily heat-sealed with the polyethylene surfaces in contact. Filled packages of this laminate cannot be consistently autoclaved, however, and for autoclaving I prefer to use a laminate of polypropylene and nylon. Such a laminate will seal readily on proper equipment and a package is provided which can be terminally sterilized by autoclaving when the nipple orifice is open and hence offers a disposable product which for the first time meets hospital practices. Nipple packages made of other films permit sterilization of the liquid food by other means in a closed package or in an open package which is sterilized, closed and placed in an outer envelope such as is illustrated in FIGURE 2 under aseptic conditions. Such packages may be packed in cartons to be sold in grocery stores like other food. When opened such packages present a completely sterile product ready for infant feeding without heating when the orifice nib is opened with a sterile hot needle or scissors.

Referring once more to the drawings:

In FIGURES 1 and 2, the nipple package 10 comprises a thin flexible film tubing 11 which has been slit at one end and hot drawn on one side to form the nipple 12. This nipple is supported in an extended position by a plug of open-celled sponge 13. When the sponge is in position, the slit end is trimmed and the end is sealed by the heat-seal 14. After sterilizing, the package is filled with its liquid sterile contents 15 from the opposite open bottom end of the tubing. The filling end may then be heat sealed closed as in FIGURE 3 or a fold-over mechanical sealing band 16 may be supplied or other closing means may be utilized. In FIGURE 6 the details of this band are illustrated. The tube 11 has a narrow strip 17 of adhesive tape adherent to it and bordering the bottom edge. Projecting ears 20 and 21 of doubled-over tape provide handles for opening the packet bottom. An adhesive tape strip 18 on the opposite side of the tube is also adherent to the tube but a narrower thin metallic strip, 19 extending the full length of adhesive tape strip 18 is interposed between the strip and the tube either as is illustrated in FIGURE 1 or as in FIGURE 6. The two adhesive strips extend beyond the tube 11 on each side with their adhesive surfaces in contact except where the metal band is interposed. The three-layered band extending from each side thus forms fold-over tabs 22 and 23. In practice, the ears 20 and 21 are grasped and pulled apart to initially open the tube bottom. After the liquid contents are inside the package, the ears 20 and 21 are folded flat and tabs 22 and 23 are pulled in opposite directions to close the package bottom. The tabs 22 and 23 are then rotated about the longitudinal axis of the band. This rotation folds the package tube about the band at least one and preferably two half turns. These folds are locked in position to make a liquid tight seal by folding back the tabs 22 and 23 over the tube fold as is shown in FIGURES 1 and 2. In FIGURE 2, the package of FIGURE 1 is shown in cross section optionally contained in a peelable-opening outer envelope 24 formed of two panels 25 and 26 which are separably sealed together around their adjacent superimposed bordering edges. Pull tabs 27 and 28 are left outside the seal. In practice, the inner package is sterilized at least on the outer side after wrapping. The outer package preserves the inner package in sterile condition until the former is opened by pulling tabs 27 and 28 apart. Obviously, the outer package may be varied. A package similar to those illustrated in the Patience Patent No. 3,062,371 may be used or a screw top container or tin can may be used. The novelty of this invention does not depend, however, upon the presence of an outer container.

In FIGURE 3, the package 30 is shown formed of panels 31 and 32 which are indicated as separate sheets but obviously a tube might be used as in FIGURE 1 or the panels may be formed of the same sheet by folding. At any rate in this embodiment, the nipple 33 is relatively flat and is formed by heat-sealing the flat panels around the nipple periphery except for the channel 34 which extends into the end seal 35. The sponge 36 is placed in the nipple after the latter is formed by heat-sealing. A portion of the periphery of the package is left unsealed until the sponge is positioned and the liquid contents are in the package. The sealing is then completed to form the heat seal 37 around the package. In practice, the end seal 35 is cut or torn off at one of the notches 38 or 39 to reveal the open channel 34 which is the nipple orifice.

In FIGURES 4 and 5, the package 40 is substantially similar to that in FIGURES 1 and 2 except for the shape of the nipple. In FIGURES 4 and 5, the thin flexible film tubing 41 is slit at the nipple end and the nipple 42 is formed preferably by hot drawing. This particular nipple is formed with external side ribs 45 and 46 which are intended to fit into the corners of the baby's mouth. The sponge plug 43 is shown extending to the back wall of the package. The heat-seal 44 seals the slit end after trimming. A hollow nib 47 provides a nipple orifice when severed.

In FIGURES 7 and 8, another embodiment of the invention is shown. This is illustrated with closed-cell sponge but open-cell sponge is normally preferred. In this embodiment the package 50 is formed preferably from a single sheet of film 51 which is drawn to almost its full width midway of the ends of the sheet to form an elliptical cup 52 with an elliptical teat 53. At the cup sides where the ellipse ends occur, the seal 56 begins, so that the nipple lies substantially on the centerline of the package when viewed from any angle. The closed-cell sponge 55 is somewhat larger in this embodiment than it is in the resilient material in some of the other nipples. The sponge is locked in by means of the retaining seals 57 at each side. The liquid contents may be injected into the chamber 54 before the package is finally sealed. The closed-cell sponge 55 necessitates an open channel 59 which leads to the nipple orifice 58. In practice the orifice 58 would be formed by cutting off a nib such as 47 in FIGURE 5 or by a sterile needle when the package is to be used. Alternatively, the hole might be covered by an adhesive tab which acts as a covering stopper for the hole.

In FIGURE 9, the nipple 60 comprises a thin film portion 61 with a thicker self-supporting base 68 formed by heat-sealing or otherwise sealing the film base 62 to an additional thickness 66 of plastic, cardboard or the like. The open pore sponge 65 is preferably inserted before the layer 66 is applied but the layer 66 has a hole centrally located through which the sponge may be inserted after the layers are sealed, if desired. The orifice hole 69 and the vent hole 70 which pierces both base layers are preferably made as a last step before sealing a flap valve in place as shown in FIGURES 10 and 11. A flap valve is not essential but it provides a more positive leak preventive feature where the cap and the top of the nipple base do not make proper contact. Preferably, the flap consists of a thin film heat-sealed as illustrated in FIGURE 11 on two sides with the other two sides free.

In FIGURE 10, the nipple 71 is substantially similar to that of FIGURE 9 excepting the vent in FIGURE 10 is a flap type which is more positive in its action. In FIGURE 10, the nipple 71 is formed of a thin film shell with a teat portion 72 and a thickened base 73. The nipple filling is open-celled foam similar to that in FIGURE 9. The nipple orifice 71 is also similar. The vent of FIGURE 10 has a vent hole 75 but it is covered on its lower side by a thin flap of film 77 which is held in place by heat-seals 76 and 76a. In practice, when there is a partial vacuum in the container, the film is forced away from the hole by outside pressure and the partial vacuum is relieved. The relationship between the base, the vent hole and the film flap is shown more clearly in the enlarged cross section taken along the line 11—11 of FIGURE 10 as viewed in the direction of the arrows.

In FIGURE 12 is shown a ribbon of film 80 from which nipple shells 81, 82 and 83 have been formed. These may continue in ribbon form, if desired, until the foam is inserted or formed in situ. An additional stiffening sheet is usually sealed to the base after which the individual orifice holes and vent holes are made and the individual nipples are punched out from the ribbon. Alternatively, the shells may be punched out as they are formed. Where female molds are utilized, it may be expedient to cast the foam directly in the forming mold after the shell has been made.

In FIGURE 13, a nipple 90 is shown after it has been filled with foam 93 and after it has been taken from the mold or punched from a ribbon. The base 92 may be heat-sealed to containers directly and a vent located outside the nipple area. Before use the nipple must be provided with an orifice and in the absence of any more elaborate provision, such an orifice may be made with a hot needle in the top of the teat portion 91.

Where a more rigid base is desirable, an additional thickness of film may be sealed to the base of the nipple of FIGURE 13 as is illustrated in FIGURE 14. The nipple orifice 97 and the vent 95 may then be made. The flap vent of FIGURE 10 is preferred, however.

In FIGURE 15, an alternative construction is shown in which the foam originally in ribbon form is also carried into the base. The nipple 100 has a nipple shell 101 filled with foam 102. A layer of foam 103 forms a filling between the nipple shell base and an annular base film similar to 94 of FIGURE 14. A vent hole 105 is covered by a film flap 106 heat-sealed into place.

In FIGURE 16, a nipple 110 has a film shell 111 filled with foam 112 and the base has a layer of foam 113. This nipple needs no vent because the nipple is able to breathe through the base edges of the open-celled foam.

As a general test of proper porosity of the resilient material of this invention, a plug of the material 1½ inches long and 11/16 inch in diameter should pass 100 cc. of distilled water through in 35 seconds or less when a column of liquid ¾ inch in diameter and initially 21½ inches high is caused to funnel through the sponge. The preferred sponges of this invention pass 100 cc. of distilled water by this test in 3 to 5 seconds. If the porosity of the resilient material is too low for satisfactory feeding, the material may be pierced to provide further channels as is done with closed-cell sponge.

In order to determine proper resiliency for the resilient materials used in the nipples of this invention, tests were run using a Dead Weight Dial Micrometer Thickness Gauge sometimes called a Comparator, Federal Products Corporation, 114 Eddy St., Providence, R. I., sells such an instrument as do others. A 1 inch circular Teflon disc 5/32 inch thick was attached to the regular foot to give a larger test area. Samples of material 3" x 3" and 1" thick were used in the test. In the test an initial reading was taken without the weight and with the 1" diameter special foot centered in the material square. The reading was taken with wetted resilient material before and after the 200 gram weight was added. The distance the foot was depressed into the resilient material by the weight was taken as an inverse measure of the resistance to compression. All of the materials tested recovered fully immediately upon removal of the weight. The results are shown in Table 1.

Table 1

| Material: | Amount depressed wet in inches |
|---|---|
| Cellulose sponge (200 g. wt.) | .620 |
| Polyester urethane foam do | .093 |
| Polyurethane (ether foam) do | .084 |
| Rubber foam do | .056 |
| Latex foam do | .164 |
| Vinyl foam do | .293 |
| Nitrile latex foam do | .240 |
| Dense polyurethane foam do | .043 |
| Medium polyurethane foam do | .310 |
| Light polyurethane foam (100 g. wt.) | .530 |

The light polyurethane foam produced a nipple that appeared somewhat lacking in resistance to compression for normal use but might be used for some premature infants. This material approaches maximum compressibility for resilient materials usable in the nipples of the invention.

The more resilient materials including rubber foam and dense polyurethane foam were all in the usable limits.

The resilient plugs of the nipples of this invention may be retained in place as in FIGURE 9 by a heat-sealed sheet or film but it is unnecessary to have retention means around the entire circumference. A short strip of material at each side is satisfactory. In many instances where the nipple is near a heat-sealed edge, a retaining flap can be incorporated with the edge seal. With some nipple plugs as in FIGURE 5, the package itself acts as the retaining means. In other cases, the shape of the nipple is such that it will retain resilient material due to a pinched-in or waist-like portion.

In addition to the fact that nipples of this invention are soft, flesh-like, yieldingly resilient and pleasantly acceptable, those which utilize open-cell sponge are non-clogging. Clogging is a frequent subject of complaint regarding rubber nipples today. Frequently the nipple orifice is partially or wholly occluded by a small lump or milk skin. Such material is filtered out by the open-celled structure of the nipples of this invention. The orifice is thus maintained in its original size permitting the baby to feed without frustrating interruptions.

Speed of manufacture is almost a necessity where the manufactured article is disposable after a single use. For that reason it is preferred to obtain the resilient material for the nipples of this invention in preformed sheets. Such sheets readily lend themselves to rapid machine manipulation whereby cylindrical or other shapes may be die cut and inserted in nipple shells. But very attractive nipples may be formed by the somewhat slower process of casting a foam made by any of the well-known methods into preformed nipple shells. Any of the well-known foams may be utilized particularly the polyurethane foams. A typical foam might be made by combining 100 parts polyester or polyether resin with 30 to 40 parts of a 65–35 to 80–20 blend of 2–4 and 2–6 isomers of tolylene diisocyanate in the presence of about 2 to 2.8 parts emulsifier, 2.2 to 3.5 parts water and 1.2 to 3 parts of well-known catalyst such as N-methyl morpholine, ethanolamine, triethylamine or the like. If preferred, a pre-polymer of the isocyanate and the polyester or polyether may be made and mixed with the other ingredients just prior to casting. It is desirable to crush or otherwise disturb the cast foam before it has set to make it pervious, as is well known. But in accordance with this invention, the foam may be pierced after it is set to make it pervious. Such cast foam nipples should be washed thoroughly to remove any traces of amines or other undesirable residues.

Washing should preferably be done with hot water or a dry heat treatment followed by cold water washing.

Because heat-sealability is a very desirable characteristic of the nipples of this invention and because nipples whose shells are thermoplastic are generally less costly, this invention has been primarily concerned with nipples with thermoplastic shells, but the invention is not limited to such nipples. Many of the advantages of the nipples of this invention may be realized with nipple shells of non-thermoplastic materials. Such materials may be made very thin and flexible and when properly filled with resilient material have all of the soft resiliency and flesh-like feel of the other nipples of the invention. Typical are those materials which cross-link or vulcanize after shaping. Excellent nipples have been made, for instance, by coating a female mold with latex which vulcanizes at room temperature or cross-links at low temperatures. Rubber latex with any of the room temperature vulcanizing or curing agents works very well. At least the teat portion of the mold is then filled with polyurethane foam either before the shell has fully cured or afterwards. Preferred nipples using this technique are those illustrated in Figures 15 and 16.

Nipples of this invention may be formed integrally with packages and containers as has been fully illustrated. They may also be formed integrally with various fastening devices whereby they may be secured to liquid containers mechanically. For instance, nipples such as those illustrated in Figures 9 and 13 may be made with integral plain, ribbed, beaded or threaded collars depending from the nipple base and intended to be snapped or screwed over the opened end of a bottle, can or plastic container containing the liquid. The liquid container may be made with a special beaded edge or a screw top or it may be an ordinary cylindrical can. Ordinarily, thin film collars form satisfactory non-leaking seals with such containers when properly fitted.

Likewise, nipples of this invention made with thermoplastic bases may be heat-sealed to various pierced collars, caps and other fastening devices as well as to the containers themselves.

For certain applications it may be advantageous to seal or heat-seal a nipple to a shrinkable collar which may be placed over a container and shrunk to form a leak-proof fastening. Likewise, it may be desirable to use nipples such as those of Figures 9, 10 and 14 in conjunction with a separate shrinkable collar fastening device. In some instances shrinking of such collars may be accomplished during the sterilization cycle.

What is claimed is:
1. A nipple for liquid feeding of infants comprising:
 (a) a hollow, shaped teat of thin film having an opening at the base end thereof for the entrance of liquid thereto, an orifice in the tip portion thereof for the flow of liquid therethrough and a flange comprising stiff, flat, incompressible material extending radially outwardly from the base of said teat around the periphery thereof to provide a seating surface for attachment to a container, the upstanding film wall portions of the teat between said tip and base being incapable of recovering by itself its original teat shape after being deformed from its original teat shape by compressive forces;
 (b) a porous plug of resilient material substantially filling said teat through which liquid may flow from said opening to said orifice and returning said wall portions to its original teat shape after being deformed by compressive forces;
 (c) means retaining said plug in said teat; and
 (d) vent means included in said flange, which vent means, when said nipple is attached to a container, permits venting the interior of said container to the atmosphere while preventing passage of liquid contents of the container through said vent means to the outside of said container, said vent means comprising
  a channel in said flange providing a passageway from the interior of said container to the atmosphere on the outside of said container, the thickness of the flange portion contiguous with the channel being no greater than the thickness of the other portions of said flange and
  a pressure actuated valve means comprising a flap of thin film positioned over the channel opening at the underside of said flange, said flap being responsive to a pressure differential between pressures inside and outside said container whereby said valve means is actuated to open and to close said channel according to the pressure differential.

2. The nipple of claim 1 wherein said thin film is attached to the underside portions of said flange adjacent the channel opening, said film being free of attachement to said side along a portion thereof extending from said channel opening to an edge of said film, the portion of unattached film constituting the flap and providing, with the underside portion of the flange covered thereby, a passageway from said channel opening past the unattached edge of said flap, which passageway is openable and closeable by movement of said flap away from and toward the underside of said flange according to said pressure differential.

3. The nipple of claim 2 wherein said flange comprises an extension of the thin film of said teat reinforced with a stiffening means.

4. The nipple of claim 1 wherein said channel has an opening on the topside of said flange and an opening on the underside of said flange.

5. The nipple of claim 1 wherein said flange comprises an extension of the thin film of said teat reinforced with a stiffening means.

6. The nipple of claim 1 wherein the porosity of said plug to the flow of liquids therethrough is such that a plug of said material 1½ inches in height and 11/16 inch in diameter passes liquid at a rate of flow not less than 100 cc. in 35 seconds when under a head provided by a column of liquid ¾ inch in diameter and initially 21½ inches high, said plug being capable of fully recovering substantially immediately upon removal of forces of compression when compressed to a depression of at least 0.043 inch.

References Cited

UNITED STATES PATENTS

| | | | |
|---|---|---|---|
| 609,415 | 8/1898 | Coulbourn et al. | 128—252 |
| 1,701,566 | 2/1929 | Havins | 128—252 XR |
| 2,939,598 | 6/1960 | Donleavy | 215—11 |
| 2,960,088 | 11/1960 | Witz | 128—252 |
| 3,193,125 | 7/1965 | Fisher | 128—252 XR |

RICHARD A. GAUDET, Primary Examiner

R. L. FRINKS, Assistant Examiner

U.S. Cl. X.R.

99—171